(12) United States Patent
Ikeda

(10) Patent No.: US 8,619,274 B2
(45) Date of Patent: Dec. 31, 2013

(54) IMAGE PROCESSING APPARATUS FOR CORRECTING DENSITY UNEVENNESS

(75) Inventor: Makoto Ikeda, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 241 days.

(21) Appl. No.: 13/157,727

(22) Filed: Jun. 10, 2011

(65) Prior Publication Data

US 2011/0310420 A1    Dec. 22, 2011

(30) Foreign Application Priority Data

Jun. 18, 2010 (JP) .................................. 2010-139924

(51) Int. Cl.
*G06F 3/12* (2006.01)
*G06K 15/00* (2006.01)
*H04N 1/405* (2006.01)

(52) U.S. Cl.
USPC ........................... 358/1.13; 358/3.06; 358/3.1

(58) Field of Classification Search
None
See application file for complete search history.

(56) References Cited

U.S. PATENT DOCUMENTS 7,924,465 B2 *   4/2011   Ike et al. .................... 358/3.06

FOREIGN PATENT DOCUMENTS

| JP | 2002-113842 | 4/2002 |
| JP | 2004-255647 | 9/2004 |

* cited by examiner

*Primary Examiner* — Tammy Pham
*Assistant Examiner* — Natasha Eaddy
(74) *Attorney, Agent, or Firm* — Finnegan, Henderson, Farabow, Garrett & Dunner, LLP

(57) ABSTRACT

When an input value is a standard value which is smaller than a maximum value (for example, 230), all pixels of a screen matrix is printed with the same output value (for example, 195), when the input value is within the range not more than the standard value, the output value is limited to not more than 195, and number of the pixels is changed so as to express graduation. In the range where the input value exceeds the standard value, the graduation is expressed by changing the output value of each pixel in the range above 195 while printing all the pixels of the screen.

7 Claims, 17 Drawing Sheets

FIG. 3a
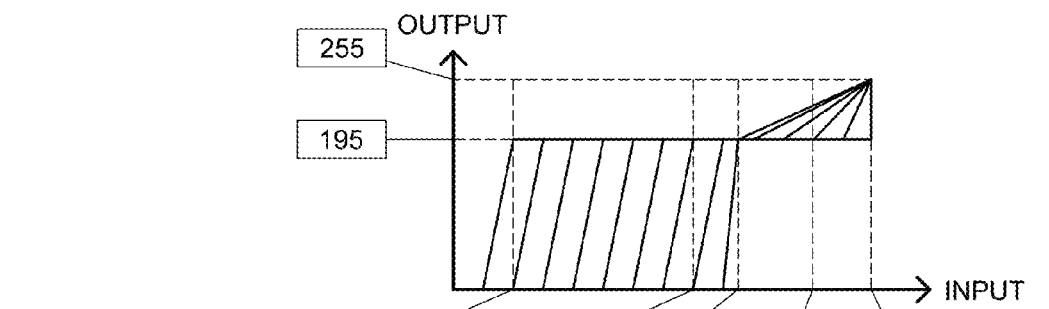
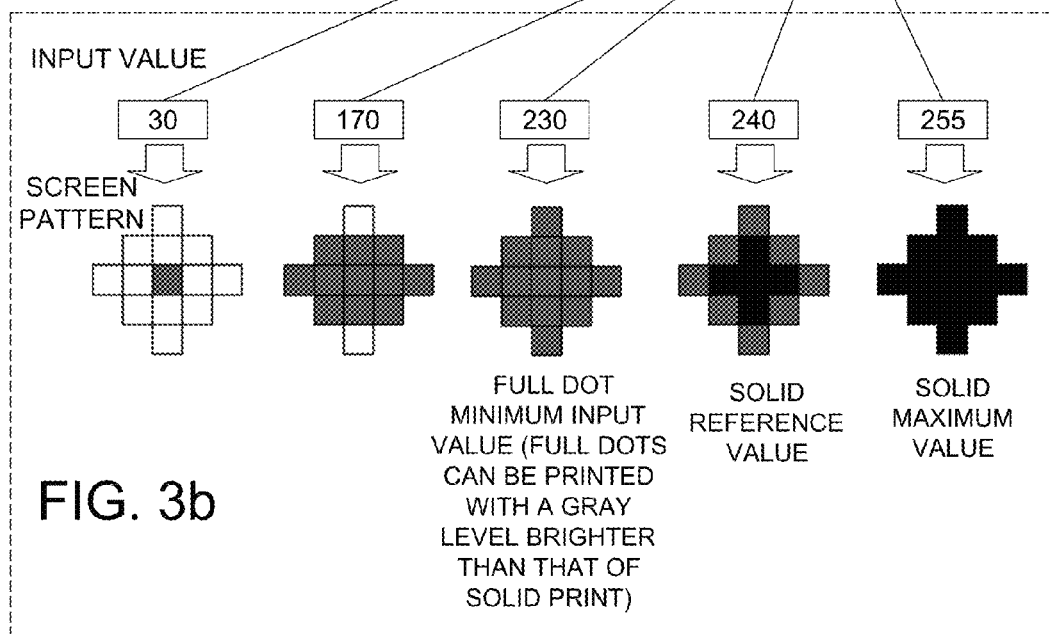
FIG. 3b
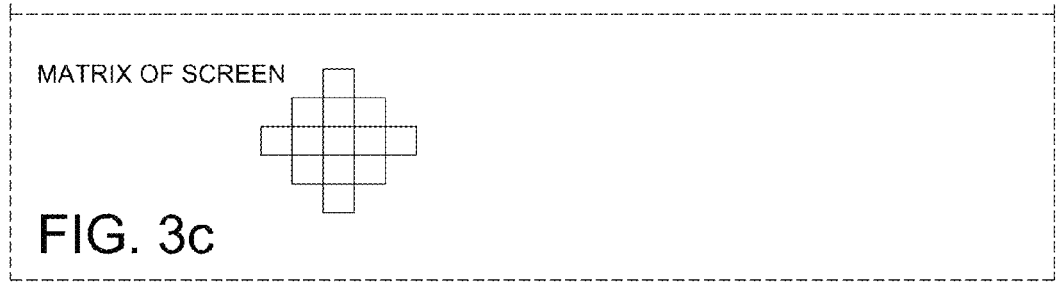
FIG. 3c

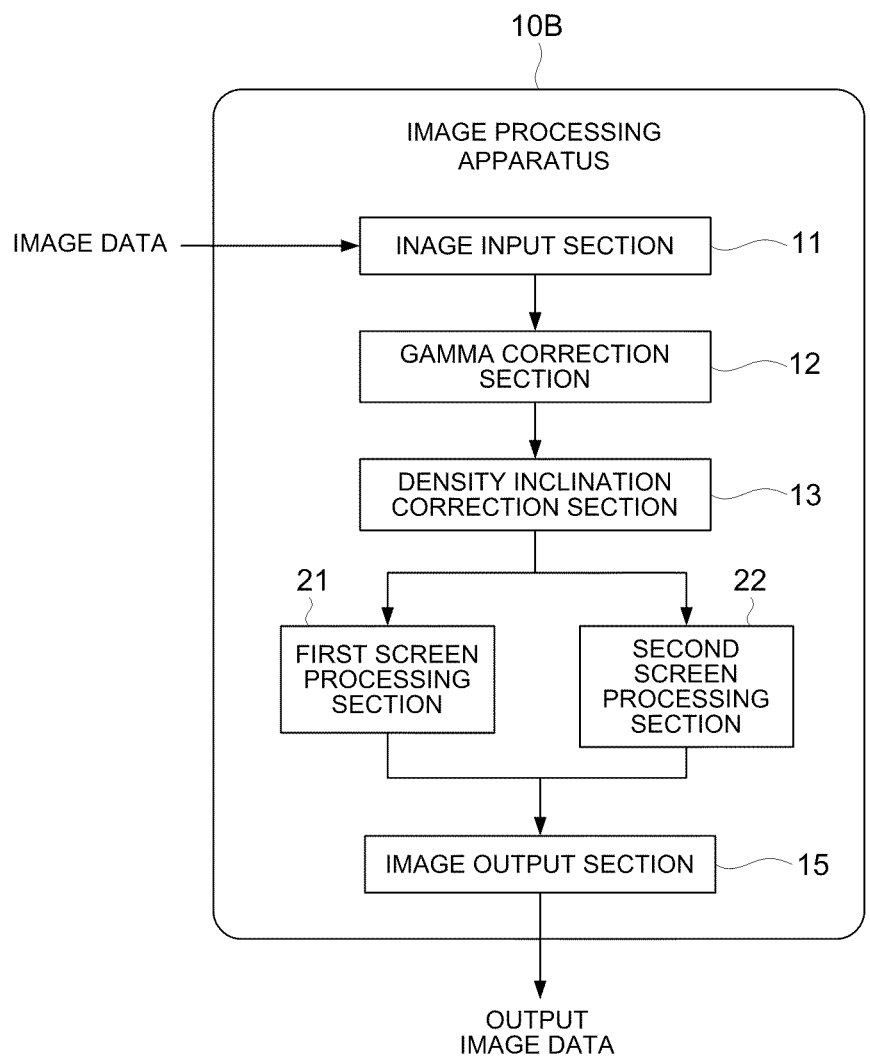

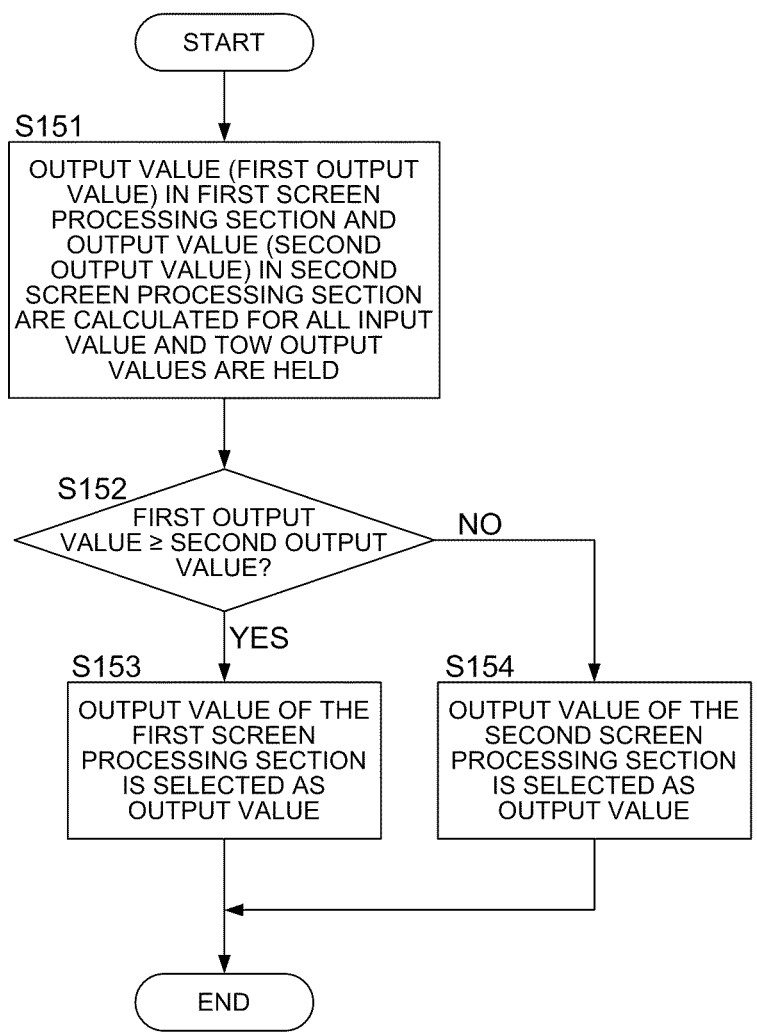

FIG. 16a
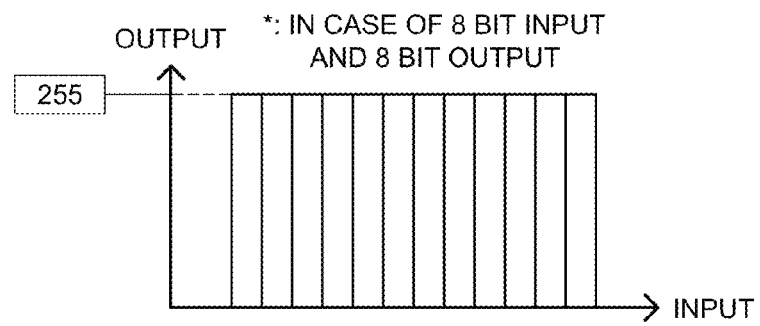
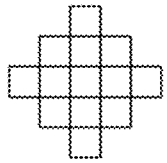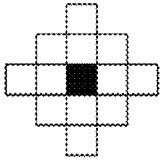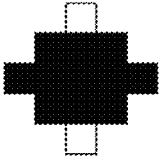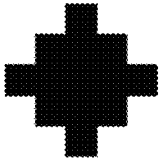
FIG. 16b
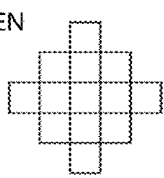
FIG. 16c

IMAGE PROCESSING APPARATUS FOR CORRECTING DENSITY UNEVENNESS

This application is based on Japanese Patent Application No. 20104 39924 filed on Jun. 18, 2010, in Japanese Patent Office, the entire content of which is hereby incorporated by reference.

BACKGROUND OF THE INVENTION

The present invention relates to an image forming processing apparatus to screen an image data.

TECHNICAL FIELD

In printing work, for graduation expression, image data is usually subject to screening (so called halftone dot process). FIG. 16a shows an exemplary characteristic of a threshold of a screen used in a conventional screening process, FIG. 16b shows a screen pattern corresponding to the example thereof and FIG. 16c shows a shape of a screen matrix. As FIG. 3c shows, the screen of the above example has a unit area (screen matrix) for graduation expression where thirteen pixels are arranged in an polyomino, which expresses fourteen kinds of graduations by increasing and decreasing number of the black pixels in the screen matrix. For example, when the input value is in the rage of 0 to 31, a screen pattern (dot pattern) where all the pixels are white, when the input value is 32, a screen patter where only one pixel in the center is black, when the input value is 240, a screen patter where eleven pixels are black except two pixels at the top and bottom and when the input value is 255, a screen patter where all the pixels are black are created.

Incidentally, when image data is printed by a printing apparatus, unevenness of density and color may occur in an outputted image. As a countermeasure for the above trouble, various technologies are suggested to correct the unevenness of density via image processing.

For example, in the following Patent Document 1: Unexamined Japanese Patent Application Publication No. 2002-113842, a technology to compensate the size of the halftone dot in advance so as to cancel the density unevenness.

Also, there is a density unevenness correction method by making an solid image not having been corrected into a halftone dot having micro dead dot which is smaller than one pixel of the halftone dot wherein by filling the micro dots the solid image is corrected to a high density side and by increasing the micro dots the solid image is corrected to a low density side (refer to the following Patent Document 2: Unexamined Japanese Patent Application Publication No. 2004-255647). In the above density unevenness correction method, it is assumed that when correction is not carried out or correction to the low density side is carried out, the micro dots disappear by bleeding of ink.

Patent Document 1: Unexamined Japanese Patent Application Publication No. 2002-113842

Patent Document 2: Unexamined Japanese Patent Application Publication No. 2004-255647

In the technology disclosed in Patent Document 1, since there is no room to enlarge the halftone dot any further in the solid image, density correction to the high density side is not possible (see the screen patter corresponding to the input value of 255 in FIG. 16). Also, if the solid image is corrected to the low density side, the structure of the halftone dot (an image revealing the shape and the frequency of the screen pattern) appears. For example, if the a screen patter corresponding to the input value of 240 in FIG. 16 is repeatedly arranged in an area of the solid image, an halftone dot structure is revealed as the image shown by FIG. 17.

Therefore, for example, though a creator of the printing matter intents that the solid image is to be printed as an even solid image without appearing the halftone dot structure, the printing image will be printed against his intention.

A density unevenness correction method in the Patent Document 2 is capable of correction to the high density side by reducing the micro dots with respect to the solid image not having been corrected, however if ink does not bleed, the micro dots appears in the solid image not having been corrected or corrected to the low density side and the solid image results in a printing image against the creator's intention in the same manner as the case of the above Patent Document 1. Also, in case of a printing apparatus not capable of printing the micro dot sufficiently smaller than the halftone dot, the above density unevenness correction method can not be applied.

SUMMARY

The present invention has one aspect to solve the above problems and an object of the present invention is to provide an image processing apparatus capable of correcting density unevenness to both the high density side and the low density side without the halftone dot structure being appeared in the solid image.

To achieve the above object, the image processing apparatus reflecting one aspect of the present invention comprises the following structures.

Structure 1. An image processing apparatus, having: an image input section to input image data; a screen processing section to screen the inputted image data; wherein below a predetermined graduation value which is brighter than a maximum graduation value expressed by setting a maximum density for all of pixels of the screen, the screen processing section expresses graduation by at least changing number of pixels to be printed, and above the predetermined graduation value, the screen processing section expresses graduation by changing the densities of the pixels while printing all the pixels of the screen.

In the above structure, in the graduation range below the predetermined graduation value which is brighter than the maximum graduation value of solid black, the number of the pixels in the screen matrix to be printed is increased and decreased to express the graduation. The predetermined graduation value is a minimum graduation value in case all the pixels are printed, and in the graduation range above the predetermined value, the graduation is expressed by changing the density of each pixel while printing all the pixels of the screen matrix. Thus in the above graduation range, dot chasm does not exist, and the graduation of inputted image can be changed without appearing the halftone dot structure.

Structure 2. The image processing apparatus of structure 1, wherein above the predetermined graduation value, all the pixels of the screen are made to be not less than a first density so as to express graduation.

In the above structure, above the predetermined graduation value (minimum graduation value in case all the pixels are printed), since all the pixels possess a density above the first density, the halftone dot structure becomes inconspicuous. Incidentally, the first density can be a density for each pixel, in case the predetermined graduation value is expressed by the same density for all the pixels. Also, in the graduation range below the predetermined graduation value, the density of all the pixels can be restricted below the first density and there can a screen where the pixels having a density above the predetermined density appears partially.

Structure 3. The image processing apparatus of structure 1 or 2, wherein the screen processing section is provided with a first screen processing section which screens so as to express graduation having a value less than the predetermined graduation value, and a second screen processing section which screens so as to express graduation having a value not less than the predetermined graduation value, wherein a matrix size of the screen of the second screen processing section is smaller than the matrix size of the screen of the first screen processing section.

In the above structure, by dividing the screen processing section into the first screen processing section and the second screen processing section, different sizes of screen matrixes can be used respectively. Then by making the matrix size of the second screen processing section smaller than that of the first screen processing section, the memory capacity to store the screen characteristic can be reduced compared to the case of one screen processing section.

Structure 4. The image processing apparatus of structure 4 wherein in a graduation range from the predetermined graduation value to a bright side, a first output value is obtained through screen processing by the first screen processing section, a second output value is obtained through screen processing by the second screen section, and one of the above outputs whichever not brighter is selected and outputted as an output value of a screen processing result.

In the above structure, the graduation ranges handled by the first screen processing section and the second screen processing section are overlapped in a predetermined graduation range from a predetermined graduation value to a brighter side. The first output value obtained as a result of screen processing in the first screen processing section or the second output value obtained as a result of screen processing in the second screen processing section, whichever higher (brighter) is selected and outputted as a result of screen process of the pixel.

Structure 5. The image processing apparatus of any one of structures 1 to 4, wherein above the predetermined graduation value, the screed processing section changes graduation value to a different graduation value by changing densities of some pixels of the screen.

In the above structure, above the predetermined graduation value, when the graduation is changed from the first graduation to the second graduation, the density of some pixels of the screed matrix is changed. For example, above the predetermined graduation value, the densities which each pixel can possesses are supposed to be the first density and the maximum density, and by increasing and decreasing the number of the pixels having the maximum density, the graduation is changed. In the above method, by expressing graduation in the graduation range above the predetermined graduation value, obtaining of the stable graduation output can be expected.

Structure 6. The image processing apparatus of any one of structures 1 to 4, wherein above the predetermined graduation value, the screed processing section changes the graduation value to a different graduation value by changing the densities of all the pixels of the screen.

In the above structure, above the predetermined graduation value, when the graduation is changed from the first graduation to the second graduation, the densities of all the pixels of the screed matrix are changed. For example, while maintaining the same density for all the pixels, the density is changed. By expressing graduation in the graduation range above the predetermined graduation value in the above method, the output graduation can be smoothly transited.

Structure 7. The image processing apparatus of any one of structures 1 to 6, further having: a gamma correction section to correct the image data so that a maximum graduation value to be able to express the image data inputted from the image input section becomes a second graduation value which is between the predetermined graduation value and the maximum graduation value; and a density inclination correction section to apply density unevenness correction of an output device to image data to which gamma correction is applied by the gamma correction section, wherein the screen processing section screens the image data outputted from the density inclination correction section.

In the above structure, gamma correction is carried out so that the solid image of a maximum density of the image data becomes the second graduation value. In case the solid image is corrected to the high density side, the density inclination correction section corrects the image data having the second graduation value inputted from the gamma correction section to the high graduation value (high density) side. Also, in case the solid image is corrected to the low density side, the image data having the second graduation value inputted from the gamma correction section is corrected to the low graduation value (low density) side. Since the second graduation value is set between the predetermined graduation value which is a minimum graduation value to print all the pixels and the maximum graduation value, even if graduation correction is carried out to the high density side or the low density side in the range which is not blow the predetermined value, the out image becomes a state where all the pixels of the screen matrix are printed and the halftone dot structure does not appear.

Structure 8. The image processing apparatus of any one of structures 1 to 7, which accepts setting change of the first density.

In the above structure, in accordance with the demands of users, the density of each pixel in case all the pixels are printed can be changed. In other word, setting of the full dot minimum input value can be changeable.

BRIEF DESCRIPTION OF THE DRAWINGS

FIGS. 3a, 3b and 3c are explanatory diagrams showing an exemplary screen used by a screen processing section of the image processing apparatus related to an embodiment of the present invention.

FIG. 7 is a block diagram showing an outline of a structure of image processing apparatus related to an embodiment of the present invention.

FIG. 13 is a flow chart indicating a screen processing in case a screen having an overlapping area is applied to a configuration having first and second screen processing sections.

FIGS. 16a, 16b and 16c are explanatory diagrams showing an exemplary screen used in a conventional screen processing.

DETAILED DESCRIPTION OF PREFERRED EMBODIMENTS

Various kinds of embodiments of the present invention will be described with reference to the drawings as follow.

Figure 1:
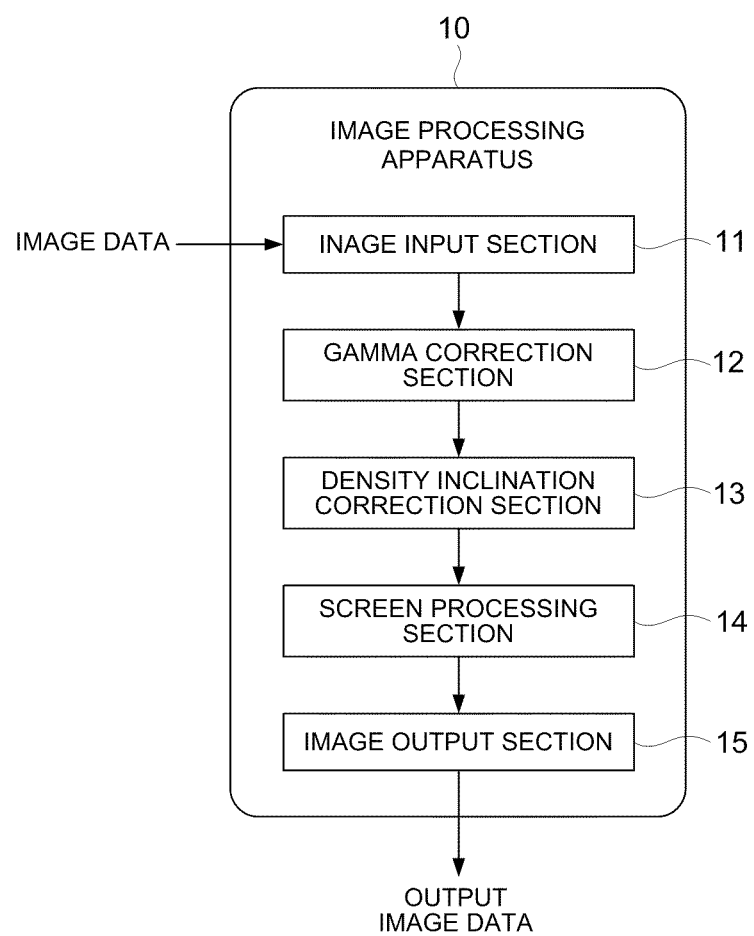
FIG. 1 is a block diagram showing an outline of a structure of an image processing apparatus related to a first embodiment of the present invention.
Figure 2:
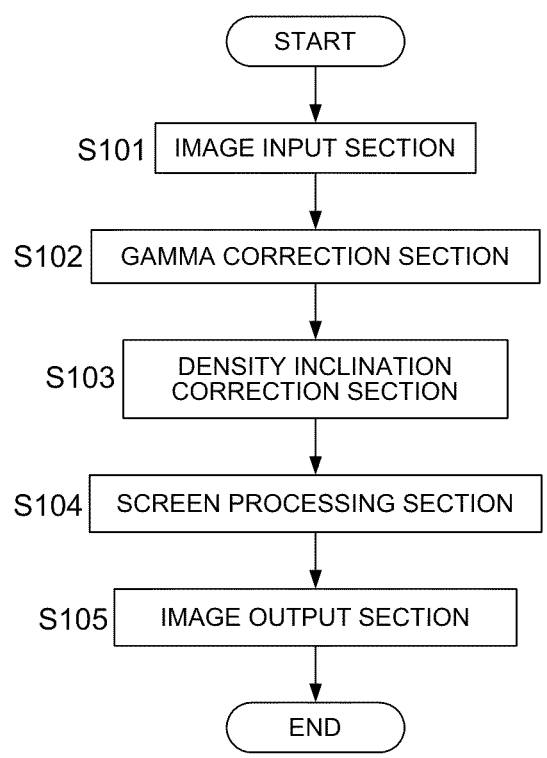
FIG. 2 is a flow chart describing a flow of image processing conducted by the image processing apparatus related to a first embodiment of the present invention.

FIG. 1 shows an outline of a structure of an image processing apparatus 10 related to a first embodiment of the present invention, and FIG. 2 shows, a flow of image processing by the image processing apparatus 10. The image processing apparatus 10 is configured with an image input section 11, a gamma correction section 12, a density inclination correction section 13, a screen processing section 14 and image output section 15. Meanwhile, the image data having been subject to the screen processing outputted from the image processing apparatus 10 is rendered, for example, for printing in a printing device.

The image input section 11 inputs image data to be processed (FIG. 2: Step S101). The image data to be inputted is the image data possible to have a plurality of density values for each pixels. Here, there can be a graduation range (density value) of 0 to 255 for each pixel and 255 is a maximum density, and the closer density value to 0, the brighter.

The gamma correction section 12 applies gamma correction with respect to the image data inputted via the image input section 11(FIG. 2: Step S202). Here, the inputted image data is corrected so that the graduation range of (0 to 255) which the inputted image data can express is converted to a graduation range from a minimum graduation value of (0) to a slid standard value (assuming that it is 240). Here, the characteristic of correction can be discretionary determined to be linier or non-liner in accordance with the quality of the image.

The density inclination correction section 13 inputs the image data outputted from the gamma correction section 12 and applies density unevenness correction of the output device to the image data (FIG. 2: Step S103) For example, a printing device to print image data outputted from the image processing apparatus 10 prints a test image in advance and the density unevenness of the printed image is measured, then correction characteristic to cancel the density unevenness is acquired and the above correction characteristic is set in the correction section 13. Thus the density inclination correction section 13 corrects the inputted image data using the correction characteristic being set.

For example, in an area where density of the printed image is lower than that of the test image, the value of the image data is corrected to a high density side, and in an area where density of the printed image is higher than that of the test image, the value of the image data is corrected to a low density side.

The screen processing section 14 screens the image data outputted from the density inclination correction section 13 (Step: S14). The pattern and the characteristic of the screen will be described later.

The image output section 15 outputs the image data having been subject to screen processing via the screen processing section 14 to an outside (for example, the printing device) (FIG. 2: Step S105).

Incidentally, the image processing apparatus 10 can be configured with a circuitry where a logic circuit and a sequencer are combined. Or the function thereof can be realized by executing a predetermined program in an information processing apparatus.

FIGS. 3a, 3b and 3c show an exemplary screen used in the screen processing section 14 of the image processing apparatus 10. FIG. 3a shows a matrix shape (screen matrix) of the screen, FIG. 3b shows a threshold characteristic of the screen and FIG. 3c shows screen patters corresponding to each of input values. The input and output values of the threshold characteristics of the screen shown by FIG. 3b are 8 bits respectively and can be in the range of 0 to 255. Also, the threshold characteristic of the FIG. 3b is shown by overlapping output and input characteristic (refer to FIG. 10) of one pixel at the same coordinate for all the pixels configuring the screen matrix.

In the above screen, when the input value is within a graduation range 230 (full dot minimum input value), the different graduations are expressed by changing number of pixels shot (printed). Also, in the graduation range where the input value is less than 230, the output value of each pixel is limited to not more than 195 (first density value). In the above example, the screen pattern is that in case the input value is 30, only one pixel having an output value of 195 is printed and in case the input value is 170, eleven pixels having the output value of 195 are printed.

In case that the input value is 230 all the pixels in the screen matrix are outputted (printed) with output values of 195 (first density value) (printed with full dot). When this occurs, since all the pixels are printed, pixel chasms of the pixels do not exist and the halftone structure does not appear. Incidentally, the minimum input value which requires full dot printing is a full dot minimum input value. Incidentally, the minimum input value at full dot printing is a full dot minimum input value. Also, an output value (the same output for all pixels) at the full dot minimum input value is a first density value.

In the range where the input value exceeds 230 (full dot minimum input value), the different graduations are expressed by changing density (output value) of each pixel while printing all the pixels in the screen matrix. Also, in the range where the input value exceeds 230 (full dot minimum input value), the output value of each pixel is 195 or more than 195 (first density value). As above, in the graduation rage where the input value exceeds 230 (full dot minimum input value), since all the pixels are printed with the first density value or more than that, the halftone structure having pixel chasms (the image on which the screen patter is conspicuous) does not appear.

Next, a process carried out by the image processing apparatus 10 to correct density of a solid image and to output will be described. Assuming that an input value of a solid image which has not been corrected is set at 240 (solid standard value). Though the original input value of the solid image is 255 (maximum value), image data, of which data value of 255 of the solid image has been converted to 240 by the gamma correction section provided before the density inclination correction section 13, is inputted to the density inclination correction section.

Figure 4:
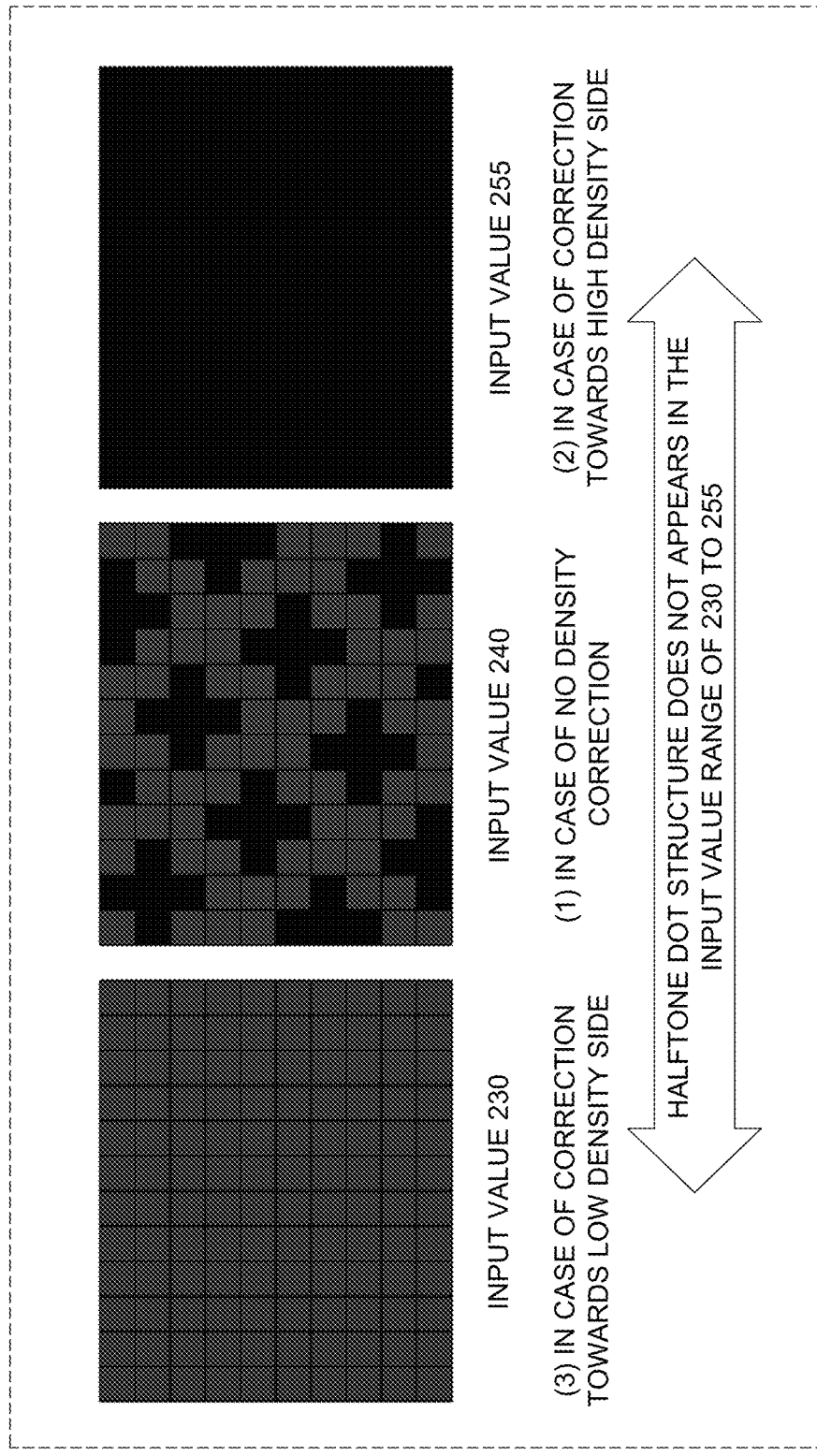
FIG. 4 is an explanatory diagram showing an exemplary output image with respect to a solid image having input values 230 to 255 outputted by the image processing apparatus related to an embodiment of the present invention.

Here, processes in the screen processing section 14 and outputted images of the flowing cases are described. (1) A case that correction is not carried out by the density inclination correction section 13, (2) A case correction to the high density side is carried out and (3) A case correction to the low density side is carried out. The exemplary output image is shown in FIG. 4.

(1) A case that correction is not carried out

An input value of 240 is inputted to the screen processing section 14, and output values of all the pixels of the screen matrix becomes 195 or more. The halftone dot structure does not appear in the outputted image.

(2) A case that correction to the high density side is carried out

An input value x is inputted to the screen processing section 14, wherein x is in the range of 240<x≤255. Since all the pixels of the screen matrix are printed with the output value of 195 (first density value) during the above period, the halftone dot structure does not appear on the output image.

(3) A case that correction to the low density side is carried out

If the input value x to be inputted to the screen processing section 14 is in the range of 230≤x<240, since all the pixels of the screen matrix are printed with the output value of 195 (first density value) or more, correction can be carried without appearing the halftone dot structure.

As above, the screen of the present invention shown by FIG. 3, the halftone dot structure does not appear on the output image having the input value of 230 to 255. Thus by determine the solid standard value (second graduation value) in between (for example, a center value of 240 between 230 and 250) and by carrying out gamma correction so that the value of the non-corrected solid image becomes a solid standard value, the density of the solid image can be corrected without appearing the halftone dot structure so as to cancel the density unevenness of the output device.

Figure 5A:
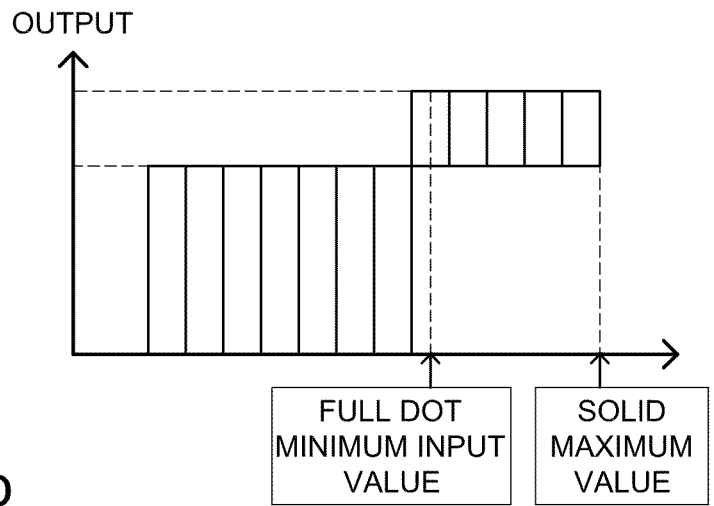
FIGS. 5a, 5b and 5c are explanatory diagrams showing threshold characteristics of a dither type screen corresponding to the present invention.
Figure 5B:
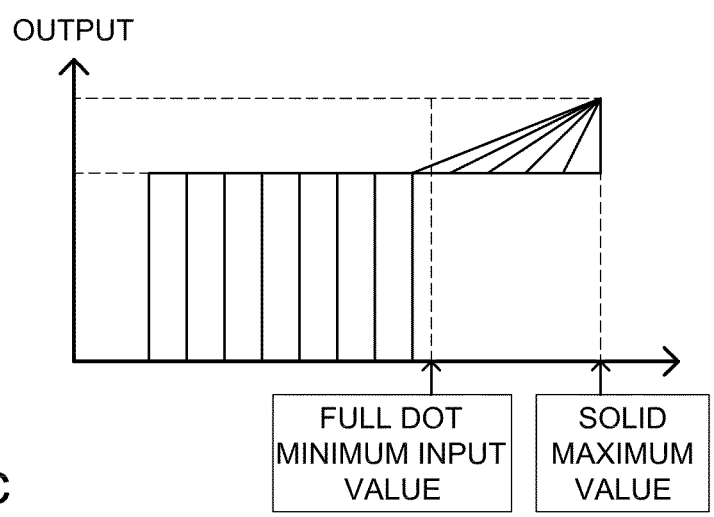
Figure 5C:
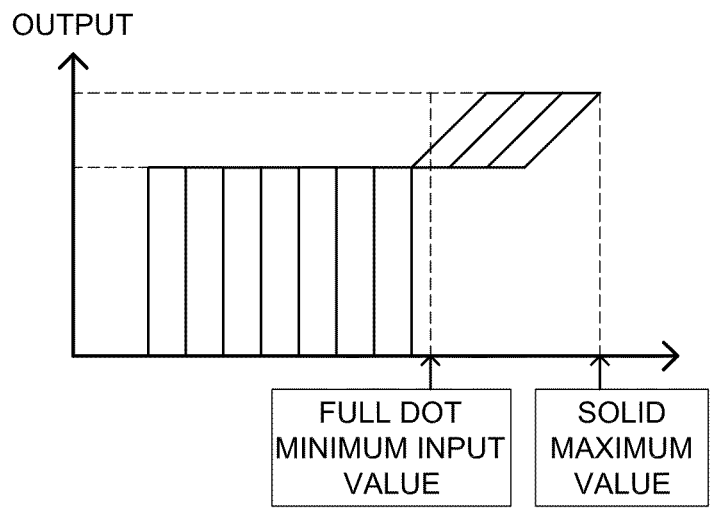
Figure 6A:
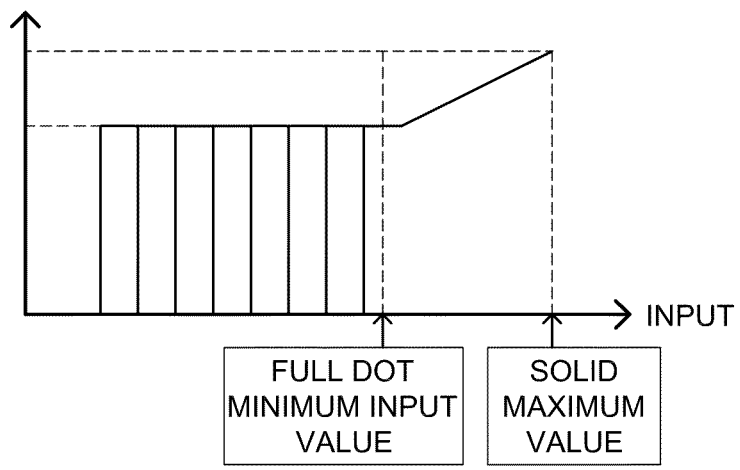
FIGS. 6a and 6b are explanatory diagrams showing threshold characteristics of a continuous tone and continuous tone like screen corresponding to the present invention.
Figure 6B:
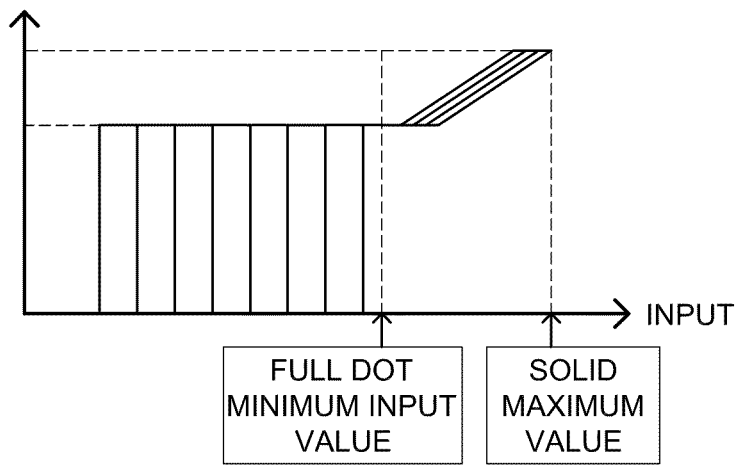

FIG. 5 and FIG. 6 show threshold characteristics of various kinds of screens corresponding to the present invention. Each of screens in FIG. 5, after the full dot minimum input value (230) to print all the pixels (full dots), changes to different graduation values are carried out by changing the density of some pixels of the screen. Namely, the dither type screen is used after the full dot minimum input value (230). Whereby, in the input range of 230 to 255, a stable output graduation can be expected.

In each of the screens in FIG. 6, after the full dot minimum value (230) to print all the pixels (full dot), a graduation value of an entire screen is changed by changing the density of all the pixels uniformly or substantially uniformly. By applying the above threshold characteristics (so-called constant tone or constant tone like threshold characteristic), it can be expected that a smooth transition of output graduation can be obtained between input values of 230 to 255.

Next a second embodiment of the present invention will be described.

In the second embodiment, the screen processing section is separately configured with a first screen processing section to handle a screen process of less than the full dot minimum input value (graduation range before printing all the pixels), and a second screen processing section to handle a screen process of not less than a full dot minimum input value (graduation range after printing all the pixels).

FIG. 7 shows an outline of configuration of an image processing apparatus 10B related to the second embodiment of the present invention. The same parts as in the image processing apparatus 10 shown in FIG. 1 are denoted by the same symbols and the descriptions thereof are omitted. The image processing apparatus 10B is provided with the first screen processing section 21 and the second screen processing section 22 instead of the screen processing section 14 of the image processing apparatus 10. The output of the density inclination correction section 13 is inputted to the first screen processing section 21 and the second screen processing section 22, and the outputs of the first screen processing section 21 and the second screen processing section 22 are both inputted to the image output section 15.

Figure 8:
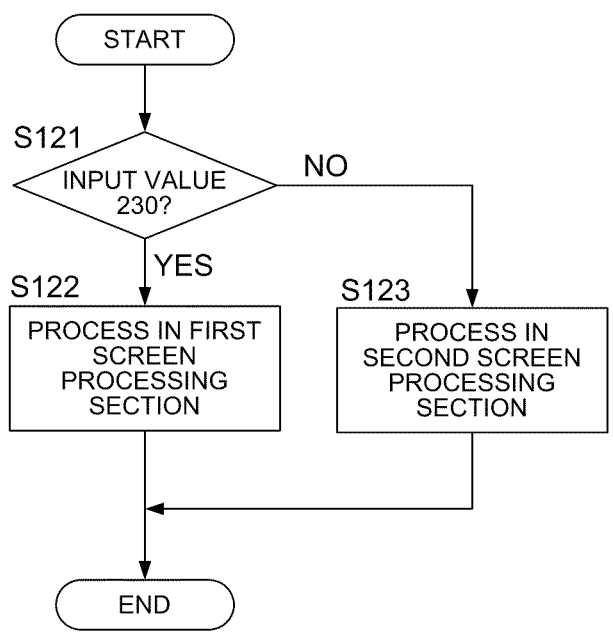
FIG. 8 is a flow chart showing a screen processing conducted by the image processing apparatus related to the embodiment of the present invention.

FIG. 8 shows a flow of the screen processing (equivalent to the Step S104 in FIG. 2) in the image processing apparatus 10B. The flow of the process of the image processing apparatus 10B is the same as that in FIG. 2 except a portion of screen processing, and description thereof will be omitted.

The following example will be described assuming that the full dot minimum input value is 230. In case input value of data inputted from the density inclination correction section 13 is not more than 230 (Step S121; Yes), the screen processing is carried out via the first screen processing section 21. When the screen processing is carried out by the first screen processing section 21, the image output section 15 selects the output of the firs screen processing section 21 and outputs.

In case the input value of the data inputted from the density inclination correction section 13 exceeds 230, the second screen processing section 22 carry out processing. When the screen processing is carried out by the second screen processing section 22, the image output section 15 selects the output of the second screen processing section 22 and outputs.

The first screen processing section 21 handles the wide graduation range of 0 to 230 and the second screen processing section 22 handles the narrow graduation range of 230 to 250, thus the screen matrix size of the second screen processing section 22 which handles the narrow graduation range can be smaller than the matrix size of the first screen processing section 21. Here, the size of the screen matrix of the first screen matrix processing section 21 is 256×256 pixels, and the size of the screen matrix of the second screen matrix processing section 22 is 4×4 pixels.

Figure 9:
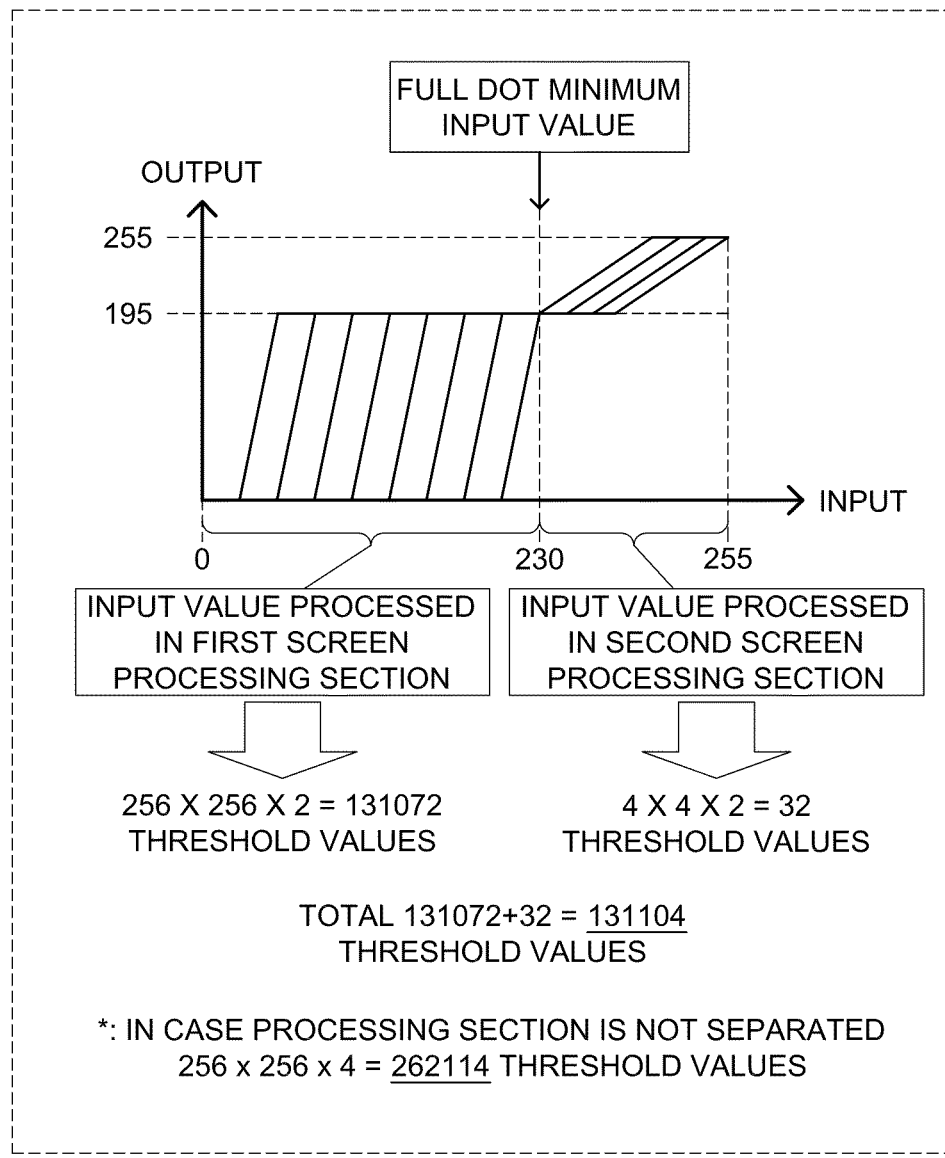
FIG. 9 is an explanatory diagram showing an exemplary threshold characteristic of a screen used in the second embodiment of the present invention.
Figure 10:
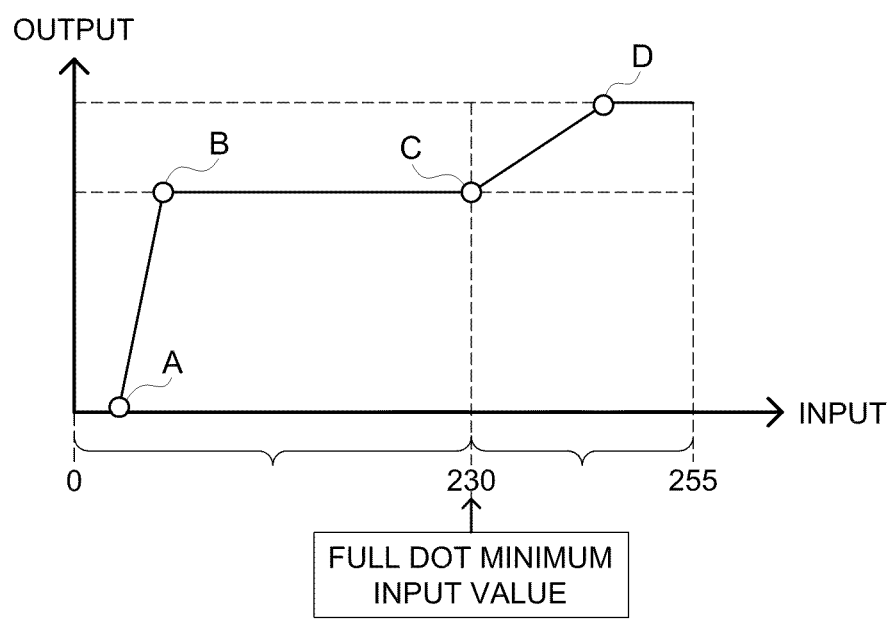
FIG. 10 is an explanatory diagram showing an exemplary threshold characteristic related to one pixel configuring a screen.

FIG. 9 shows an exemplary threshold characteristic of the screen used in the second embodiment. A line graph in FIG. 10 shows an input and output characteristic about one pixel in the screen matrix. In order to specify the characteristic, four points (four thresholds) i.e. A, B, C and D have only to be assigned. Incidentally, for all the pixels of the screen matrix, the output values are uniformed such as the output value of point A is 0, points B and C are 195 and point D is 255. To specify each point of coordinate, only input values have to be stored as the thresholds.

Since the first screen processing section 21 has only to retain the threshold characteristic of the graduation range of less than the full dot minimum input value, threshold values of points A and B are sufficient. Since the size of the screen matrix of the first screen processing section 21 is 256×256 pixels, the threshold of the two points A and B for 256×256 pixels are sufficient, and number of the thresholds is 256× 256×2=1310732. Since the second screen processing section 22 have only to retain the threshold characteristic of the graduation range of more than the full dot minimum input value, the threshold values of points C and D are sufficient. Since the size of the screen matrix of the second screen processing section 22 is 4×4, the threshold of two points C and D for 4×4 pixels are sufficient, and the number of the threshold is 4×4×2=32 (refer to FIG. 9). Thus a total number of necessary thresholds is 131104.

Contrarily, as the first embodiment, if only one screen processing section 14 applies screen processing for all the graduation range, the size of the screen matrix has to be a larger one which is 256×256 and the thresholds of each of points A, B, C and D have to be for 256×256 pixels. Namely, the total number of the necessary threshold is 256×256× 4=262114.

As above, in the second embodiment, by dividing the screen processing section into the first and the second screen processing sections, the necessary number of the threshold to specify the threshold characteristic of the screen can be reduced, thus a capacity of the memory necessary to store the thresholds can be drastically reduced compared to the first embodiment.

Incidentally, both in the image processing apparatus 10 related to the first embodiment and in the image processing apparatus 10B of the second embodiment, setting of the first density value representing an output value at full dot minimum value can be discretionary changed by a user. Specifically, a user I/F to receive setting of the first density value is provided and the output value set is stored, for example, in a non-volatile memory. The screen processing section 14 changes the threshold characteristic of the screen in accordance with the first density value set and stored in the non-volatile memory. Specifically, the screen processing is carried out with a characteristic where the output values at the above points B and C represents the first density value set.

Incidentally, setting of the full dot minimum input value can be changeable instead of the first density value. If the full dot minimum input value is expressed by printing with the first density value which is the same for all the pixels of the screen, the first density value is changed in accordance with the full dot minimum input value. Therefore, the full dot minimum input vale and the first density value are in a relation of linear and it can be discretionary determined that which setting of the above values is changeable.

Next, the third embodiment of the present invention will be described.

In the first and second embodiments, all the dots become the first density at the full dot minimum input value, and above the full dot minimum input value, all the pixels become more than the first density, and then below the full dot minimum input value, the density of all the pixels is made less than the first density. The screen of the third embodiment has an overlapping area to allow the pixel having a density more than the first density to appear even below the full dot minimum input value.

Figure 11A:
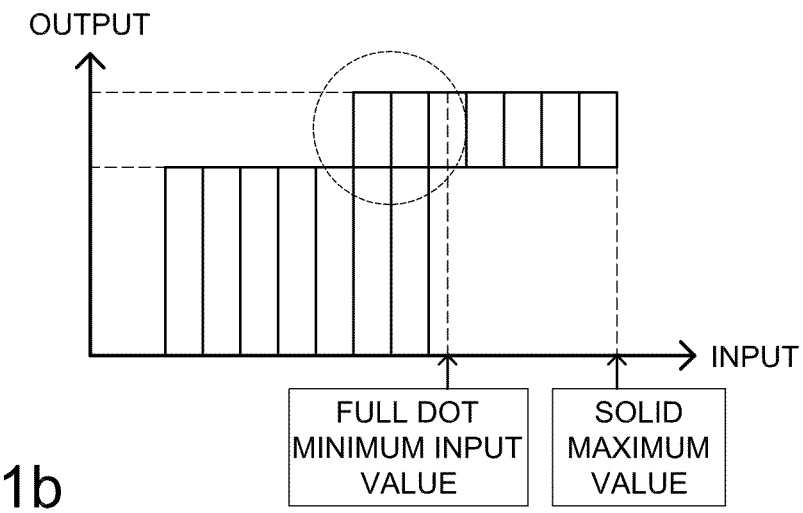
FIGS. 11a, 11b and 11e are explanatory diagrams showing an exemplary threshold characteristic of a screen having an overlapping area.
Figure 11B:
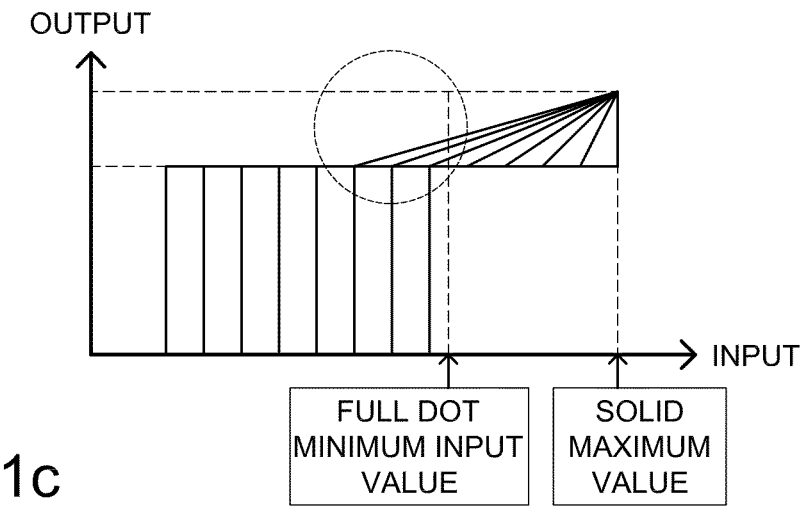
Figure 11C:
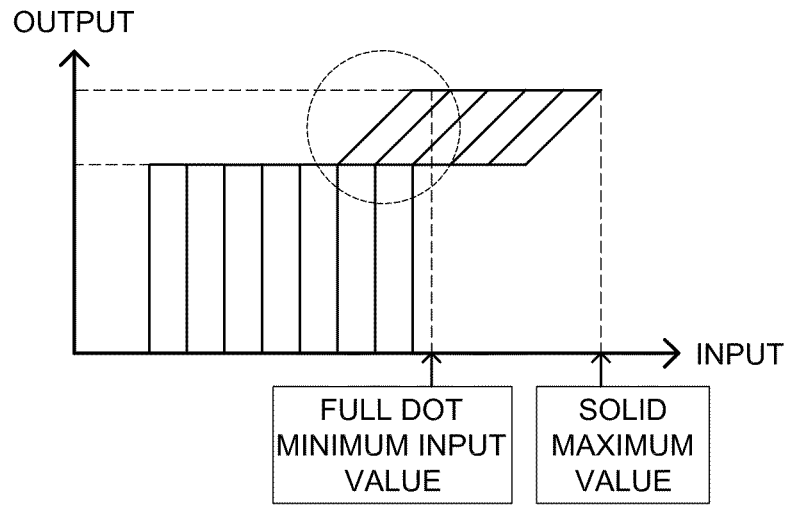

FIG. 11 shows threshold characteristics of various kids of screens provided with overlapping areas. An area surrounded by broken lines in the figure shows an overlapping area (an area where the pixel having more than first density appears even below the full dot minimum input value).

Figure 12A:
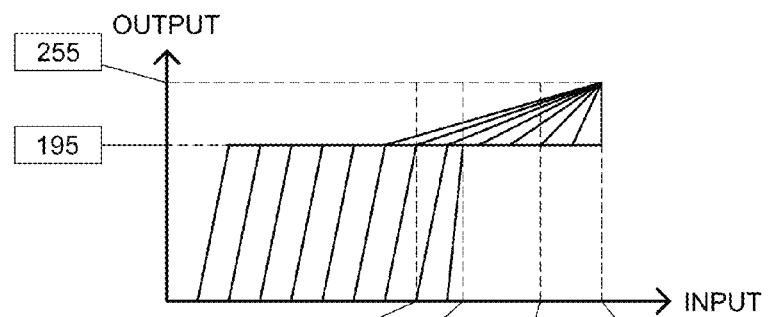
FIGS. 12a and 12b is an explanatory diagram showing an exemplary screen having an overlapping area used by the screen processing section of an image processing apparatus related to an third embodiment of the present invention.
Figure 12B:
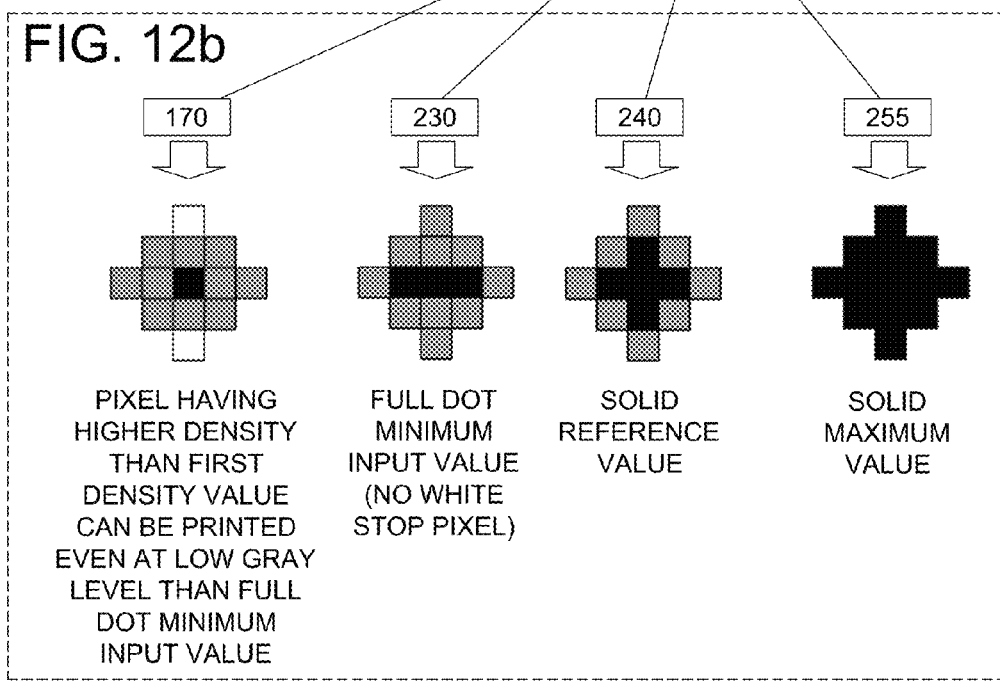
Figure 14:
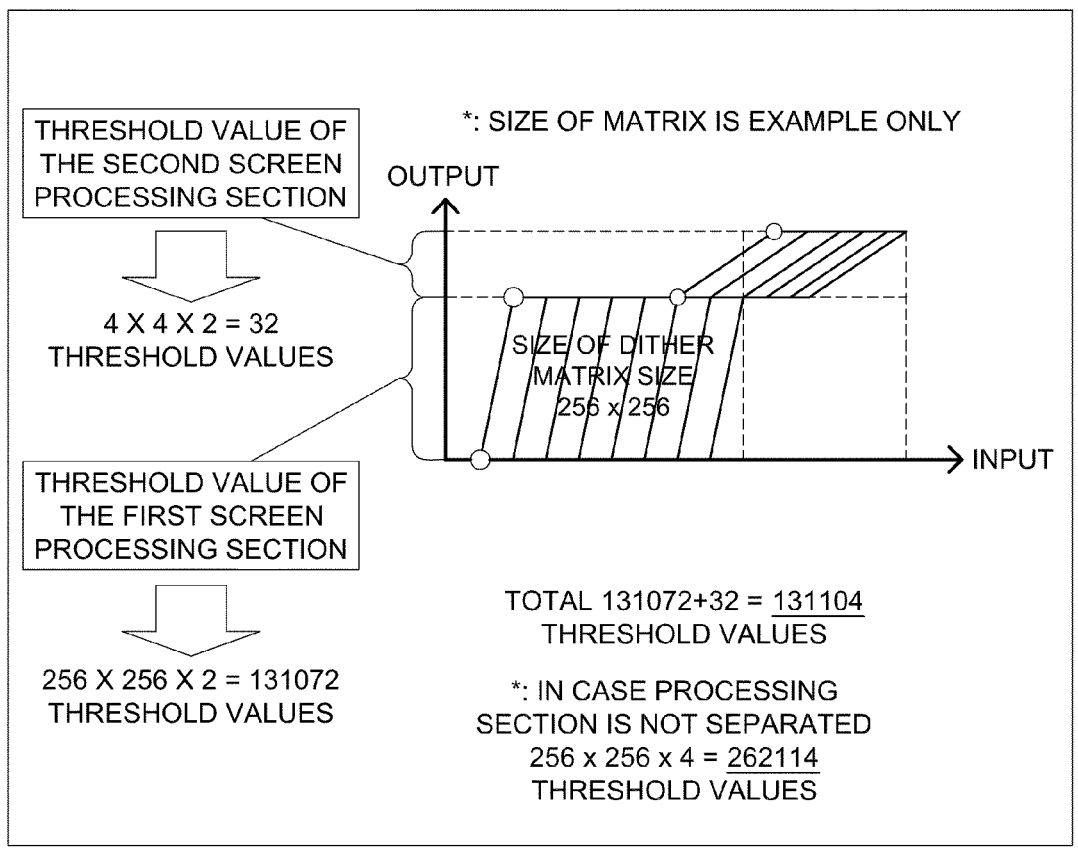
FIG. 14 is an explanatory diagram showing an amount of stored data when a screen having an overlapping area is applied to a configuration having a first screen processing section and a second screen processing section.

FIG. 12 shows an exemplary screen having an overlapping area and a density status of each pixel configuring the screen at each input value. In the above example, the input value of 230 is the full dot minimum input value. In a lower density (input value 170) than the full dot minimum input value, pixels (pixels at a center) having higher density appear. Also, the pixels having higher density than the first density appear at the full dot minimum input value of 230. In the above case, the first density is a minimum density in the screen patter in the full dot minimum input value.

Even in the above threshold characteristic, the halftone dot structure (image in which the screen patter is conspicuous) to cause dot chasms does not appear. As above, by providing the over lapping area, even if the ability of density expression at each pixel of a printer is insufficient, occurrence of tone jump is inhibited and reproduction is possible with a smooth graduation characteristic between a graduation lower than the full dot minimum input value and a high graduation.

Incidentally, the screen having overlapping area can be applied to a structure that the screen processing section is separated into the first screen processing section 21 and the second screen processing section 22 such as the second embodiment as follow.

Instead of the process in FIG. 8, a process in FIG. 13 is conducted. Namely, since the overlapping area exists, since whether the first screen processing section 21 or the second screen processing section 22 carries out the process cannot be decided based on the input value, it is decided based on the output value. The input value of each pixel inputted from the density inclination section 13 is inputted to the first screen processing section 21 and the second screen processing section 22 respectively. An output value (first output value) processed by the first screen processing section 21 and an output value (second output value) processed by the second screen processing section 22 are calculated and stored (Step S151).

By comparing the first output value and the second output value (Step S152), if the first output value is greater than the second output value (Step S152; Yes), the output of the first screen processing section 21 is selected as an output for the pixel and outputted to the image output section 15 (Step S153). On the other hand, if the first output value is less than the second output value (Step S152; No), the output value of the second screen processing section 22 is selected as an output for the pixel and outputted to the image output section 15.

Figure 15A:
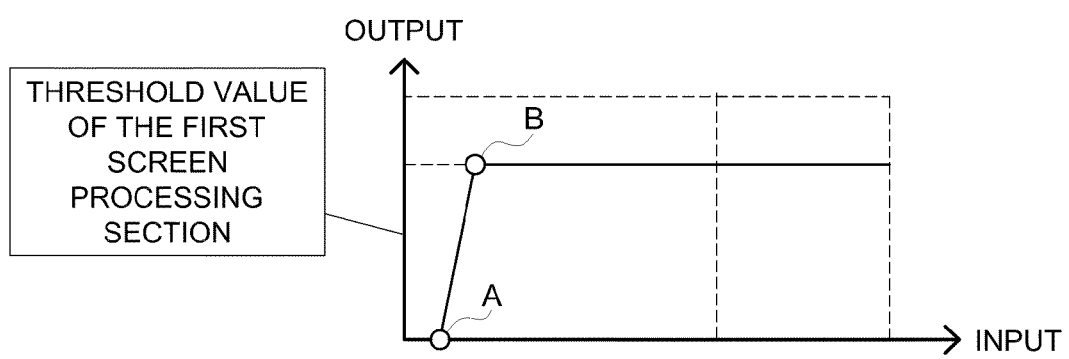
FIGS. 15a and 15b are explanatory diagrams showing threshold characteristics related to one pixel configuring a screen having an overlapping area.
Figure 15B:
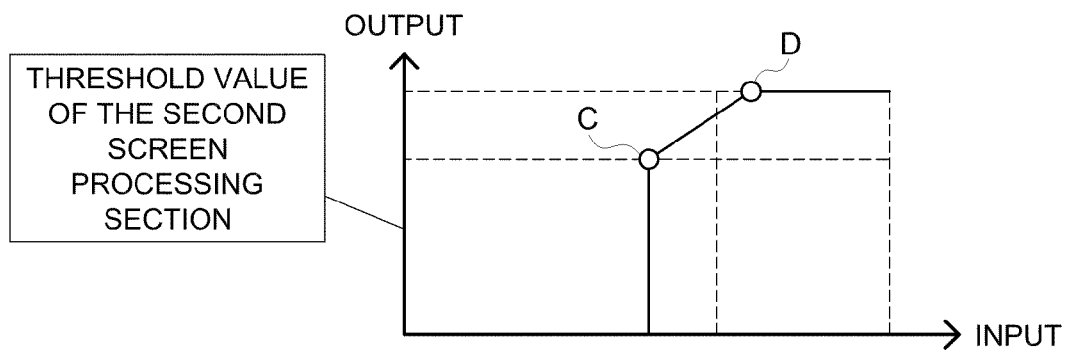
Figure 17:
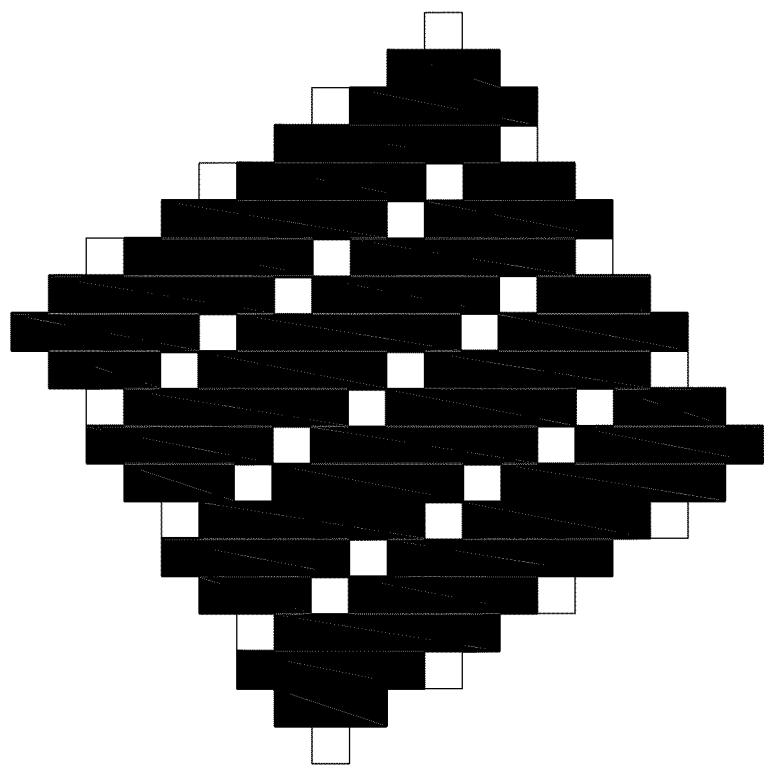
FIG. 17 is an explanatory diagram exemplifying an output image in case a solid image is connected to a lower density side via a conventional screen processing.

As above, an amount of data of the threshold which the first screen processing section 21 and the second screen processing section 22 have to maintain does not change and the same effect as that of the second embodiment can be obtained as the effect of separating the process. Namely, the input and output characteristic for one pixel to be maintained by the first screen processing section 21 is shown in FIG. 15a and the input and output characteristic for one pixel to be maintained by the second screen processing section 22 is shown in FIG. 15b. Therefore, in the same manner as in FIG. 10, the first screen processing section 21 has only to store the thresholds of two points A and B for one pixel and the second screen processing section 22 has only to store the thresholds of two points C and D for one pixel.

As above, the embodiments of the present have been described with reference to the drawings without the structures in practice being limited thereto and it is to be understood that changes and variations may be made without departing from the spirit or scope of the appended claims.

For example, in the present embodiment, while the gamma correction section 12 is disposed inside the present image processing apparatuses 10 and 10B, it can be configured that the gamma correction section 12 is disposed outside the image processing apparatus 10 and it can be configured that only image data having been subject to the gamma correction is inputted via the image input section 11.

Incidentally, in the present embodiment, above the full dot minimum input value, each pixel has a density more that the first density value, however by printing full dot at full dot minimum input value, a specific pixel can have a higher output value than the first density value and the output value of other pixel can be lower than the first density value. Also, in the embodiment, in the graduation range less than the full dot minimum input value, though the output value is limited to not more than the first density value, the pixel having the first density value can exist. For example, the density values of some pixels can be above the first density value by lowering output of the other pixels to a certain extent accordingly.

Incidentally, as the embodiments indicated, for changing the graduation smoothly across the screen, it is preferable that the output values at the full dot minimum input value are the same output values (first density value) for all the pixels of the screen, in the graduation range of less than the full dot minimum input value, the output values are limited to below the first density value and in the graduation rage of not less than the full dot input minimum value, the output values of all the pixels are above the first density value.

According to the image processing apparatus related to the present embodiments, unevenness of density can be corrected to the high density side and the low density side without the halftone dot structure being appeared in the solid image.

What is claimed is:

1. An image processing apparatus, comprising:
    an image input section to input image data; and
    a screen processing section to screen the inputted image data, comprising:
    a first screen processing section which performs screen processing to express graduation at least by changing a number of pixels to be printed below a predetermined graduation value which is brighter than a maximum graduation value expressed by setting a maximum density for all of pixels of a screen, and
    a second screen processing section which performs screen processing to express graduation by changing the densities of the pixels while printing all the pixels of the screen,
    wherein a matrix size of the screen of the second screen processing section is smaller than a matrix size of the screen of the first screen processing section.

2. The image processing apparatus of claim 1, wherein above the predetermined graduation value, all the pixels of the screen are made to be not less than a first density so as to express graduation.

3. The image processing apparatus of claim 1 wherein in a graduation range from the predetermined graduation value to a bright side, a first output value is obtained through screen processing by the first screen processing section, a second output value is obtained through screen processing by the second screen section, and one of the above outputs whichever not brighter is selected and outputted as an output value of a screen processing result.

4. The image processing apparatus of claim 1, wherein above the predetermined graduation value, the screed processing section changes graduation value to a different graduation value by changing densities of some pixels of the screen.

5. The image processing apparatus of claim 1, wherein above the predetermined graduation value, the screed processing section changes the graduation value to a different graduation value by changing the densities of all the pixels of the screen.

6. The image processing apparatus of claim 1, further comprising:
    a gamma correction section to correct the image data so that a maximum graduation value to be able to express the image data inputted from the image input section becomes a second graduation value which is between the predetermined graduation value and the maximum graduation value; and
    a density inclination correction section to apply density unevenness correction of an output device to image data to which gamma correction is applied by the gamma correction section, wherein the screen processing section screens the image data outputted from the density inclination correction section.

7. The image processing apparatus of claim 2, further configured to accept setting change of the first density.

* * * * *